US 6,655,761 B2

(12) United States Patent
Chen

(10) Patent No.: US 6,655,761 B2
(45) Date of Patent: Dec. 2, 2003

(54) INTEGRALLY STAMPED REAR PANEL OF COMPUTER ENCLOSURE

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/891,048

(22) Filed: Jun. 25, 2001

(65) Prior Publication Data

US 2002/0175603 A1 Nov. 28, 2002

(30) Foreign Application Priority Data

May 23, 2001 (TW) ........................................ 090208382

(51) Int. Cl.⁷ .............................. A47B 97/00; H05K 7/18
(52) U.S. Cl. ..................................... 312/223.2; 361/683
(58) Field of Search ........................ 312/223.1, 223.2, 312/265.6; 361/725, 726, 683, 686, 801, 816, 825; 211/26, 41.17; 174/35 GC

(56) References Cited

U.S. PATENT DOCUMENTS

| 4,873,395 | A | * | 10/1989 | Mast | ..................... 174/35 GC |
| 5,575,546 | A | * | 11/1996 | Radloff | ................ 312/223.1 X |
| 5,757,618 | A | * | 5/1998 | Lee | ........................ 361/801 X |
| 5,790,372 | A | * | 8/1998 | Dewey et al. | ....... 312/223.2 X |
| 5,936,835 | A | * | 8/1999 | Astier | ......................... 361/683 |
| 5,947,571 | A | * | 9/1999 | Ho | ...................... 312/223.2 X |
| 6,058,025 | A | * | 5/2000 | Ecker et al. | ................ 361/816 |
| 6,114,622 | A | * | 9/2000 | Draeger | .................. 361/816 X |
| 6,182,835 | B1 | * | 2/2001 | Chen | .................. 211/41.17 X |
| 6,222,725 | B1 | * | 4/2001 | Jo | ....................... 312/223.2 X |
| 6,231,139 | B1 | * | 5/2001 | Chen | ....................... 312/223.2 |
| 6,367,897 | B1 | * | 4/2002 | Bass et al. | ............... 312/223.2 |

FOREIGN PATENT DOCUMENTS

JP           11-3137      *    1/1999

* cited by examiner

Primary Examiner—James O. Hansen
(74) Attorney, Agent, or Firm—Wei Te Chung

(57) ABSTRACT

A rear panel (10) of a computer enclosure includes a rear wall (12) and a stamped portion (14) which is integrally stamped from the rear wall. The stamped portion has an inner plate (15) and three connection plates (16, 18, 19) respectively connecting a left side, a right side and a top side of the inner plate to the rear wall. A window (22) is defined in the inner plate, for extension of connectors therethrough. A plurality of parallel slots (21) is defined through both the inner plate and the left connection plate. A bar (25) is formed between every two adjacent slots. Each bar forms a rib (26) thereon for reinforcing the overall structure of the rear panel. A plurality of L-shaped guard boards (23) engagably covers the corresponding slots.

4 Claims, 3 Drawing Sheets

INTEGRALLY STAMPED REAR PANEL OF COMPUTER ENCLOSURE

BACKGROUND OF THE INVENTION

1. Field of the Invention

The present invention relates to external panels of computer enclosures, and particularly to rear panels of computer enclosures having simple configuration and reduced electromagnetic radiation leakage.

2. Prior art

A conventional rear panel of a computer enclosure often comprises a rear wall and a rear plate. The rear wall defines a fixing opening whose shape mates with the rear plate. A plurality of parallel slots is defined in the rear plate, for extension of expansion cards therethrough. The rear plate is mounted to the rear wall at the fixing opening with screws or rivets. Unfortunately, seams between the rear wall and rear plate have gaps. Electromagnetic energy radiated by circuitry within the enclosure can leak out through the gaps. Such electromagnetic radiation interferes with other radiated signals, and can also interfere with the proper operation of other electrical equipment within and outside the enclosure. This is commonly referred to as Electromagnetic Interference (EMI).

To overcome EMI, manufacturers often add spring tabs or shims between the rear wall and rear plate. This is time-consuming, and adds to the costs of manufacturing. In addition, since the rear wall and rear plate are two separate parts joined together with screws or rivets, the overall strength of the rear panel is limited.

FIG. 3 shows a conventional rear panel 1 designed to overcome the above problems. The rear panel 1 is integrally made from a flat metal sheet. An opening 2 and a plurality of slots 3 are directly stamped from the rear panel 1. A plurality of guard boards 4 respectively covers the corresponding expansion slots 3. A bent plate 5 is stamped outwardly from one end of each expansion slot 3, thus forming a longitudinal slot 6 in the rear panel 1. A plurality of screw holes 7 is defined in the bent plate 5. A U-shaped cutout 9 is defined in a bent end 8 of each guard board 4, for aligning with the corresponding screw hole 7 of the bent plate 5.

In order to contain EMI, the rear panel 1 needs an extra plate (not shown) to cover the slot 6. Furthermore, because the rear panel 1 is substantially planar, heads of connectors (not shown) mounted to the rear panel 1 protrude outwardly from the computer enclosure. The heads are prone to be accidentally bumped and thereby loosened or damaged.

Thus, an improved rear panel of a computer enclosure which overcomes the above problems is desired.

BRIEF SUMMARY OF THE INVENTION

Accordingly, an object of the present invention is to provide a rear panel of a computer enclosure which can efficiently prevent EMI.

Another object of the present invention is to provide a rear panel of a computer enclosure which has a simple structure and high overall strength.

Still another object of the present invention is to provide a rear panel of a computer enclosure which can protect electronic components such as connectors from being damaged.

To achieve the above-mentioned objects, a rear panel of a computer enclosure comprises a rear wall and a stamped portion which is integrally stamped from the rear wall. The stamped portion has an inner plate and three connection plates respectively perpendicularly connecting a left side, a right side and a top side of the inner plate to the rear wall. A window is defined in the inner plate, for extension of connectors therethrough. A plurality of parallel slots is defined through both the inner plate and the left connection plate. A bar is thus formed between every two adjacent slots. Each bar forms a rib thereon for reinforcing the overall structure of the rear panel. A plurality of L-shaped guard boards engagably covers the corresponding slots.

Other objects, advantages and novel features of the present invention will be drawn from the following detailed description of a preferred embodiment of the present invention together with the attached drawings, in which:

DESCRIPTION OF THE PREFERRED EMBODIMENT

Figure 1:
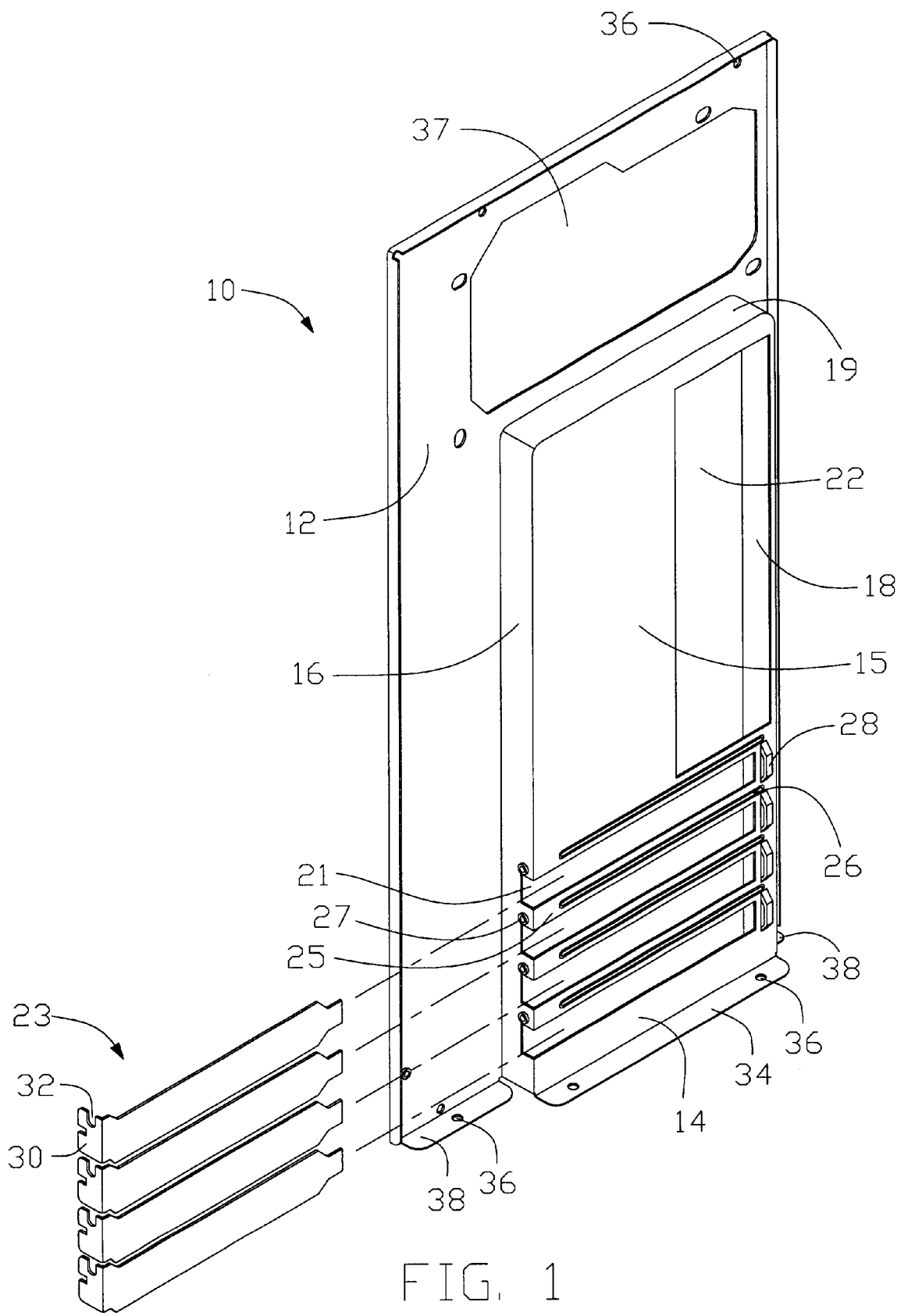
FIG. 1 is a perspective view of a rear panel of a computer enclosure in accordance with the present invention, together with a plurality of guard boards.
Figure 2:
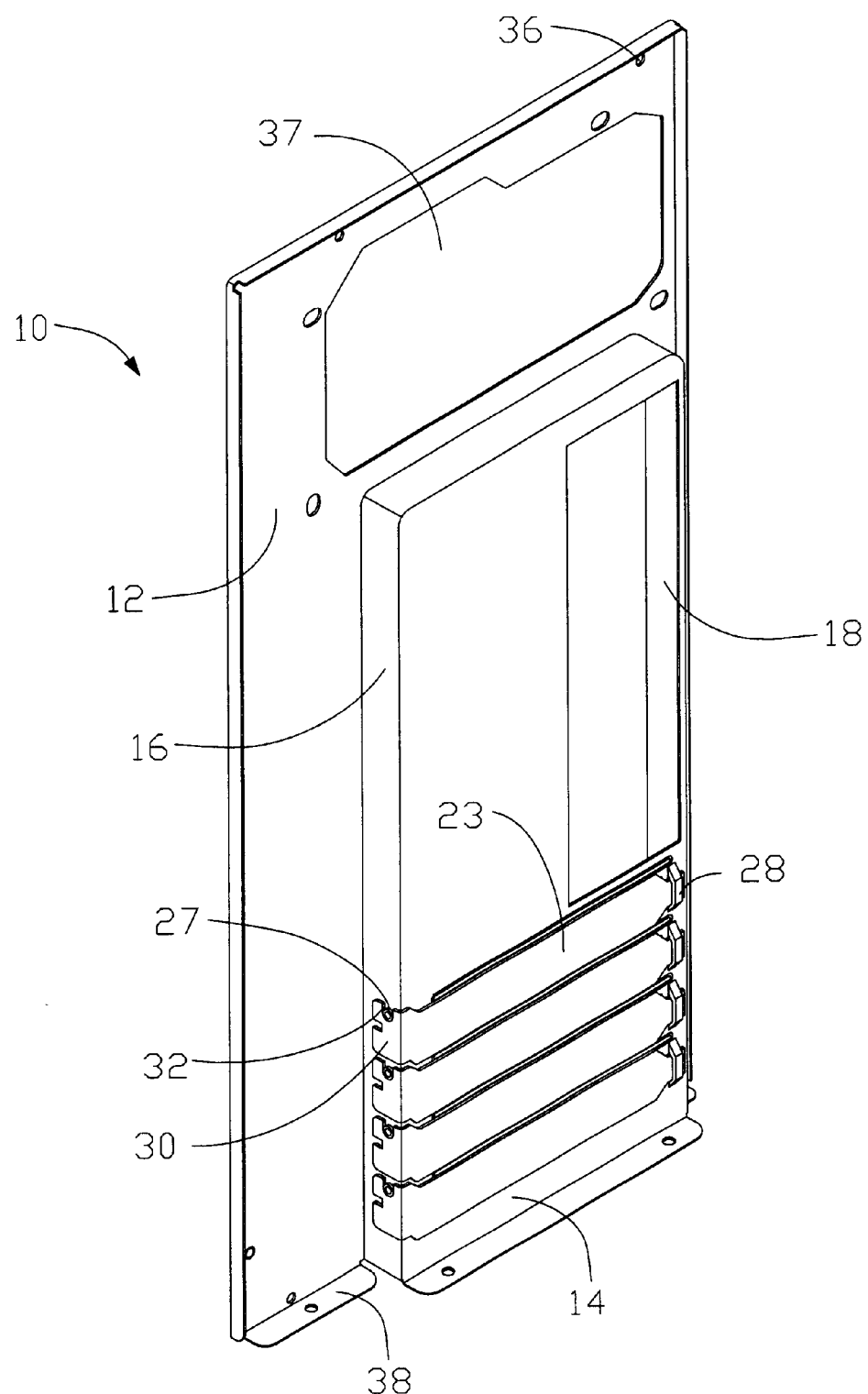
FIG. 2 is an assembled view of FIG. 1.
Figure 3:
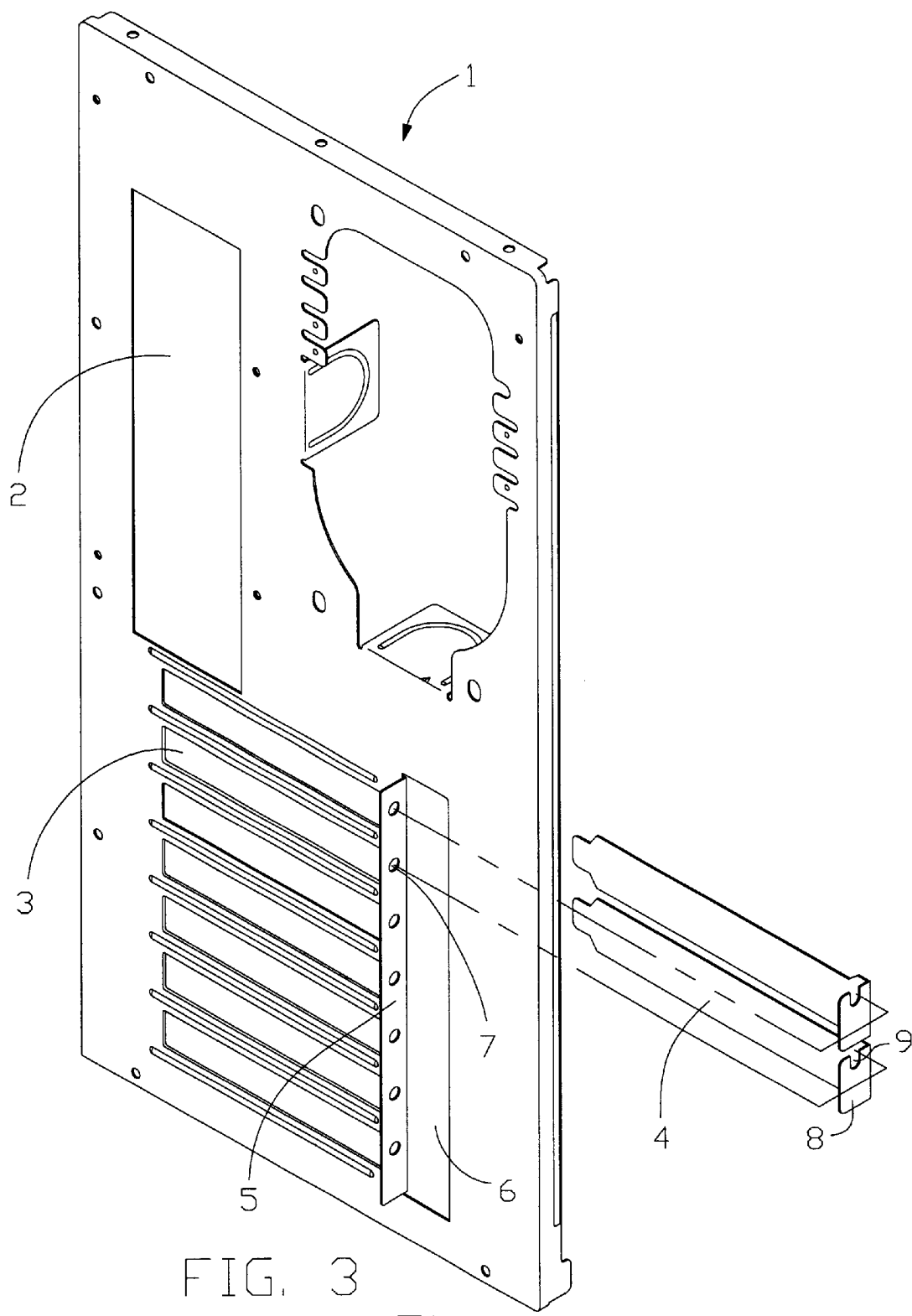
FIG. 3 is a perspective view of a conventional rear panel of a computer enclosure, together with two guard boards.

Referring to FIGS. 1 and 2, a rear panel 10 of a computer enclosure (not shown) comprises a rear wall 12 and a stamped portion 14. An opening 37 is defined in an upper portion of the rear wall 12, corresponding to a power supply (not shown) to be accommodated in the computer enclosure (not shown). A pair of bent flanges 38 extends inwardly from a bottom edge of the rear wall 12, at opposite sides of the stamped portion 14 respectively.

The stamped portion 14 is stretchedly stamped inwardly from the rear wall 12. The stamped portion 14 comprises an inner plate 15, a left connection plate 16, a right connection plate 18, and a top connection plate 19 respectively connecting the inner plate 15 to the rear wall 12. The inner plate 15 is set back a predetermined distance from the rear wall 12. The left connection plate 16, right connection plate 18, and top connection plate 19 are all perpendicular to the rear wall 12 and the inner plate 15. The inner plate 15, left connection plate 16, right connection plate 18, and top connection plate 19 cooperative define a space (not labeled) therebetween for accommodating heads of connectors (not shown) extending through a longitudinal window 22 of the inner plate 15. A plurality of horizontal slots 21 is defined through both a lower portion of the inner plate 15 and the left connection plate 16, for extension of expansion cards therethrough in use. A horizontal bar 25 is thus formed between every two adjacent slots 21. A horizontal rib 26 is formed along each bar 25 and in the inner plate 15 above the topmost slot 21, for reinforcing the overall structure of the rear panel 10. An annulus (not labeled) is formed on the left connection plate 16 above each slot 21, on a surface of the left connection plate 16 facing an interior of the computer enclosure (not shown). A protruding screw hole 27 is defined in each annulus (not labeled). A fixing portion 28 is inwardly formed from the inner plate 15 at an end of each slot 21 near the right connection plate 18. A bent flange 34 extends inwardly from a bottom edge of the inner plate 15.

A plurality of screw apertures 36 is defined in the bent flanges 38, 34 of the rear wall 12 and inner plate 15.

Each guard board 23 is generally L-shaped, and is fastenable to the rear panel 10 in order to cover one slot 21. A bent head 30 extends perpendicularly from one end of the guard board 23. A U-shaped cutout 32 is defined at an upper edge of the bent head 30, for fittingly receiving the corresponding annulus (not labeled) of the left connection plate 16 of the rear panel 10. The guard board 23 has a tapered end opposite to the bent head 30, for extending into the corresponding fixing portion 28 of the inner plate 15 of the rear panel 10. A screw (not shown) is extendable through the cutout 32 of the guard board 23 to engage in the corresponding screw hole 27 of the rear panel 10. Opposite longitudinal edges of each guard board 23 are spaced apart such as to abut against the corresponding adjacent reinforcing ribs 26 of the inner plate 15 of the rear panel 10.

Because the stamped portion 14 of the rear panel 10 is integrally formed from the rear panel 10, extra components such as spring tabs and shims for containing EMI are not needed. Additionally, the ribs 26 reinforce the overall structure of the rear panel 10. Furthermore, the space (not labeled) for accommodating heads of connectors prevents the heads from being accidentally bumped and thereby loosened or damaged.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A rear panel adapted to be attached to a rear portion of a computer enclosure, comprising:

a rear wall; and a stamped portion integrally stamped inwardly from the rear wall, the stamped portion comprising an inner plate and three connection plates respectively connecting a left side, a right side and a top side of the inner plate to the rear wall, a bent flange being formed inwardly from a bottom edge of the inner plate, the bent flange defining a plurality of screw apertures for extension of screws therethrough adapted to attach the rear panel to the computer enclosure, the inner plate defining a plurality of parallel slots adapted for extension of expansion cards therethrough.

2. The rear panel as described in claim 1, wherein the slots are covered by guard boards fixed to one of the connection plates.

3. A rear panel assembly for use with a computer enclosure, comprising:

a rear wall exposed to an exterior in a first direction and defining at least one opening therein;

a stamped portion directly stamped inwardly from the rear wall, said stamped portion defining an inner plate parallel to said rear wall and a plurality of circumferential connection plates connected between the inner plate and the rear wall, so as to form a huge recess in said stamped portion exposed to the exterior in said first direction perpendicular to said inner plate, wherein said stamped portion has no connection plate on one side to allow the recess to communicate with the exterior in a second direction before said rear panel assembly is assembled to the computer enclosure, said second direction being perpendicular to said first direction; and a plurality of expansion card slots formed in said inner plate for exposing corresponding expansion card assemblies to the exterior in said first direction.

4. The assembly as described in claim 3, wherein said expansion card slots extend longitudinally in the inner plate along a third direction perpendicular to said first direction.

* * * * *